United States Patent
Grall et al.

(10) Patent No.: US 11,833,614 B2
(45) Date of Patent: Dec. 5, 2023

(54) THREE-DIMENSIONAL PRINTING DEVICE

(71) Applicant: Safran Aircraft Engines, Paris (FR)

(72) Inventors: Terence Grall, Moissy-cramayel (FR); Cédric Pierre Jacques Colas, Moissy-Cramayel (FR); Hugo Jean-Louis Sistach, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 689 days.

(21) Appl. No.: 16/788,566

(22) Filed: Feb. 12, 2020

(65) Prior Publication Data
US 2020/0254692 A1 Aug. 13, 2020

(30) Foreign Application Priority Data
Feb. 13, 2019 (FR) ...................................... 1901438

(51) Int. Cl.
| | |
|---|---|
| *B23K 26/342* | (2014.01) |
| *B23K 26/34* | (2014.01) |
| *B23K 26/14* | (2014.01) |
| *B33Y 30/00* | (2015.01) |

(52) U.S. Cl.
CPC ............ *B23K 26/342* (2015.10); *B23K 26/14* (2013.01); *B23K 26/34* (2013.01); *B33Y 30/00* (2014.12)

(58) Field of Classification Search
CPC ...... B23K 26/342; B23K 26/14; B23K 26/34; B23K 26/123; B23K 26/127; B23K 26/06; B23K 26/0604; B33Y 30/00

USPC ..................................................... 219/121.63
See application file for complete search history.

(56) References Cited

U.S. PATENT DOCUMENTS

| | | | |
|---|---|---|---|
| 10,260,585 B2 * | 4/2019 | Saga ........................ | B61H 5/00 |
| 10,661,343 B2 * | 5/2020 | Matthews ............ | B22D 23/003 |
| 2002/0117485 A1 | 8/2002 | Jones et al. | |
| 2016/0228988 A1 | 8/2016 | Dallarosa et al. | |
| 2018/0178327 A1 * | 6/2018 | Smith ................ | B23K 26/0626 |
| 2019/0047088 A1 * | 2/2019 | Riemann ................. | B22F 12/53 |
| 2020/0016703 A1 * | 1/2020 | Maritano ................ | B22F 10/36 |

FOREIGN PATENT DOCUMENTS

| | | | |
|---|---|---|---|
| CN | 103862046 A | | 6/2014 |
| JP | 2020093271 A | * | 6/2020 |

OTHER PUBLICATIONS

Shielding Gas, Oct. 20, 2014, Wikipedia, https://en.wikipedia.org/w/index.php?title=Shielding_gas&oldid=630366269 (Year: 2014).*
Using Shielding Gas Efficiently, Aug. 26, 2016, Fabricating Metalworking, https://www.fabricatingandmetalworking.com/2016/08/using-shielding-gas-efficiently/ (Year: 2016).*

* cited by examiner

*Primary Examiner* — Dana Ross
*Assistant Examiner* — Joseph W Iskra
(74) *Attorney, Agent, or Firm* — BLANK ROME LLP

(57) ABSTRACT

An assembly of a device for three-dimensional printing by metal deposition comprising a conduit for guiding a metal wire and opening inside an enclosure under an inert atmosphere. The device has means for injecting an inert gas into the conduit of the head.

6 Claims, 2 Drawing Sheets

THREE-DIMENSIONAL PRINTING DEVICE

CROSS-REFERENCE TO RELATED APPLICATIONS

This application claims priority to French Patent Application No. 1901438, filed Feb. 13, 2019, the contents of which are incorporated by reference herein.

TECHNICAL FIELD

This invention relates to the field of three-dimensional printing devices.

BACKGROUND

Three-dimensional printing using the so-called LMD (Laser Metal Deposition) process consists in successively depositing thin layers of molten metal.

FIG. 1 shows a LMD printing device 10a of a known type, comprising an enclosure 12 under inert atmosphere, a head 14a with a longitudinal conduit 16a for guiding a metal wire 18. The head 14a opens into the enclosure 12 and has an elongated tubular body with a distal end 20a connected to a wire outlet nozzle 18. The guide conduit 16a of the metal wire 18 is mounted in the elongated tubular body of the head 14a. This guide conduit 16a includes a distal end portion 20a forming the wire exit nozzle 18.

The metal wire 18 coming out of the head 14a is heated by heating means 22 carried by the head 14a. These heating means consist of lasers oriented to melt the metal wire 18 coming out of the conduit. These heating means include means for emitting one or more high temperature 22b laser beam(s) that impact(s) and melt(s) the metal wire 18.

During operation, the metal wire 18 is inserted at a proximal end 20b of the guide conduit 16a and moves in and along the guide conduit 16a. An annular clearance must be provided between an inner annular face of the guide conduit 16a and an outer annular surface of the wire 18 to allow its movement to the distal end 20a of the conduit 16a. Once the wire has come out of the nozzle, it is heated by the heating means 22. This heating, carried out at a distance from the outlet nozzle, by the laser beam, melts the metal wire 18. The wire, in a molten state, is applied continuously to a substrate 24 or to one of the thin layers of molten metal 26 previously applied to form the desired three-dimensional part.

Such a printing process leads to a difficulty related to the introduction of outside air 28 into the enclosure 12 through the guide conduit 16a.

Specifically, this difficulty relates to the introduction of an outside air 28 flow into the guide conduit 16 from outside the conduit, which then exits through the outlet nozzle into the enclosure 12. This air 28 comes to pollute enclosure 12 under an inert atmosphere and oxidize the thin layers of molten metal 26 superimposed to make a part to be printed.

The invention aims at realizing a three-dimensional printing device, responding to the above-mentioned problem of the prior art.

SUMMARY

Thus, the present document relates to a device for three-dimensional printing by metal deposition comprising a conduit for guiding a metal wire opening into an enclosure under an inert atmosphere, characterized in that the device comprises means for injecting an inert gas into the guide conduit.

The presence of means for injecting an inert gas into the metal wire guide conduit makes it possible to generate an overpressure in the conduit and to prevent outside air introduced into the conduit from reaching the distal end of the conduit through which the metal wire exits. This overpressure generated in the guide conduit thus prevents outside air from entering the enclosure under an inert atmosphere and oxidizing thin layers of molten metal deposited on a substrate or other previously deposited thin layers of molten metal.

The injection means may comprise an inert gas supply conduit, a downstream end of which opens into the conduit and an upstream end of which is connected to inert gas supply means.

The inert gas injection means comprise an inert gas supply conduit which is in fluid connection with the wire guide conduit and with inert gas supply means which supply the inert gas supply conduit at an upstream end. The inert gas flows through the supply conduit until it emerges at its downstream end in the guide conduit.

The guide conduit can be substantially straight. The inert gas supply conduit may open at its downstream end in a direction substantially perpendicular to the guide conduit.

More generally, the guide conduit may be substantially straight, the downstream end of the inert gas supply conduit extending in a direction forming an angle less than or equal to 90° with a direction of elongation of the guide conduit at the outlet of the inert gas supply conduit into the guide conduit. In this way, it is easier to oppose the flow of outside air into the guide conduit by means of a relatively small inert gas flow.

The above-mentioned angle may be comprised between a first rectilinear portion of the guide conduit and a second rectilinear portion of the inert gas supply conduit, the first rectilinear portion extending from the distal end of the guide conduit to the outlet of the inert gas supply conduit into the guide conduit and the second rectilinear portion joining the outlet of the gas supply conduit into the guide conduit.

The orientation of the outlet of the inert gas supply conduit generates an overpressure in the wire guide conduit, blocking the flow of outside air introduced into the wire guide conduit. In this way, the wire guide conduit is free of oxygen-rich air between the overpressure generated and its distal end, i.e. inside the enclosure. Such an arrangement of the inert gas supply line limits the introduction of air into the enclosure to inert air.

Furthermore, in order to further prevent the introduction of outside air, it can be expected that the above-mentioned angle is strictly less than 90°. In this way, the air flow from the supply conduit is for the most part directed towards the end of the guide conduit that opens outside the enclosure.

The injection means can be configured to inject inert gas with a flow pressure between 2 and 6 bars.

A flow of inert gas between 2 and 6 bar generates an overpressure and stops the movement of outside air in the wire guide conduit.

The inert gas can be argon or nitrogen. This gas avoids any reaction with the part and/or the deposited material and therefore avoids any contamination linked to the external atmosphere.

The device may still include heating means capable of melting the wire.

These heating means can be housed in a head comprising the heating means which are arranged around the wire guide conduit.

The heating means may comprise one or more means for emitting a laser beam, the laser beams converging at a given point of application of the metal wire.

The head supporting the heating means can be structurally separate from the metal wire guide conduit.

The invention will be better understood and other details, characteristics and advantages of the invention will appear when reading the following description, which is given as a non-limiting example, with reference to the attached drawings.

DETAILED DESCRIPTION

Figure 1:
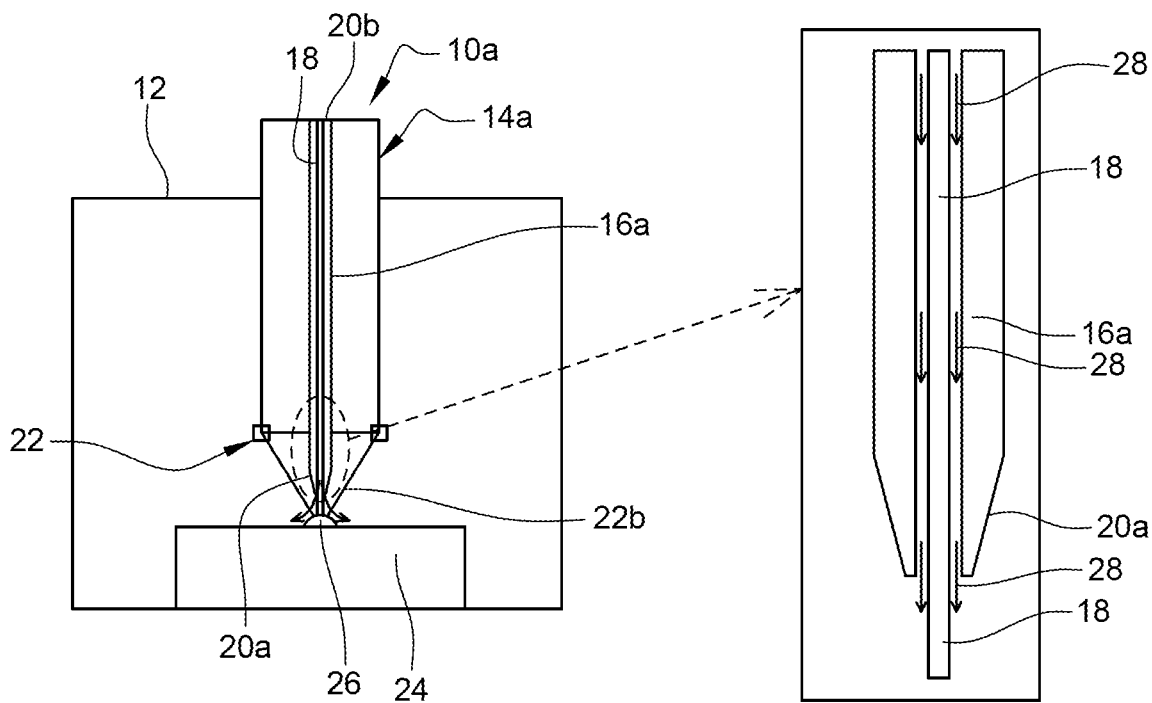
FIG. 1 is a schematic view of a three-dimensional printing device according to the prior art described above.

The device 10b for three-dimensional printing, according to the invention, comprises an enclosure 12 under an inert atmosphere, means 30 for injecting inert gas 32 and a head 14b comprising a conduit 16b for guiding a metal wire 18. The head 14b opens into the enclosure 12, and has an elongated tubular body wherein the tubular conduit 16b for guiding the wire 18 is mounted. The head 14b, and more precisely the guide conduit 16b housed in the head 14b, has a distal end 20a which is connected to a wire outlet nozzle.

The inert gas 32 injection means 30 comprises an inert gas supply conduit 36 which is connected to a supply means 34. The inert gas 32 enters the supply conduit 36 from an upstream end 361 of the conduit, connected to the supply means 34, and discharges into the wire guide conduit 16b from a downstream end 362 of the supply conduit.

The wire guide conduit 16b is substantially straight and extends in a direction of elongation X. The inert gas supply conduit 36 opens, at its downstream end 362, in a direction substantially perpendicular to the direction of elongation X of the wire guide conduit 16b.

The injection means 30 are configured to inject inert gas 32 with a flow rate pressure between 2 and 6 bars.

When the inert gas 32 is injected with a flow rate between 2 and 6 bar into the inert gas supply conduit 36, the inert gas 32 introduced into the wire guide conduit 16b generates an overpressure in the wire guide conduit. The overpressure generated by the injection of inert gas 32 prevents the outside air 28 that has entered the guide conduit 16b from moving beyond the overpressure. Thus, the wire guide conduit 16b has an oxygen-free fluid between the overpressure and the distal end 20a of the guide conduit 14b.

In a particular embodiment, the head 14b has through openings (not shown) between the area of the guide conduit 16b intended to be under overpressure and the wire outlet nozzle. The through openings allow fluid communication of the guide conduit 16b with the enclosure.

Figure 2:
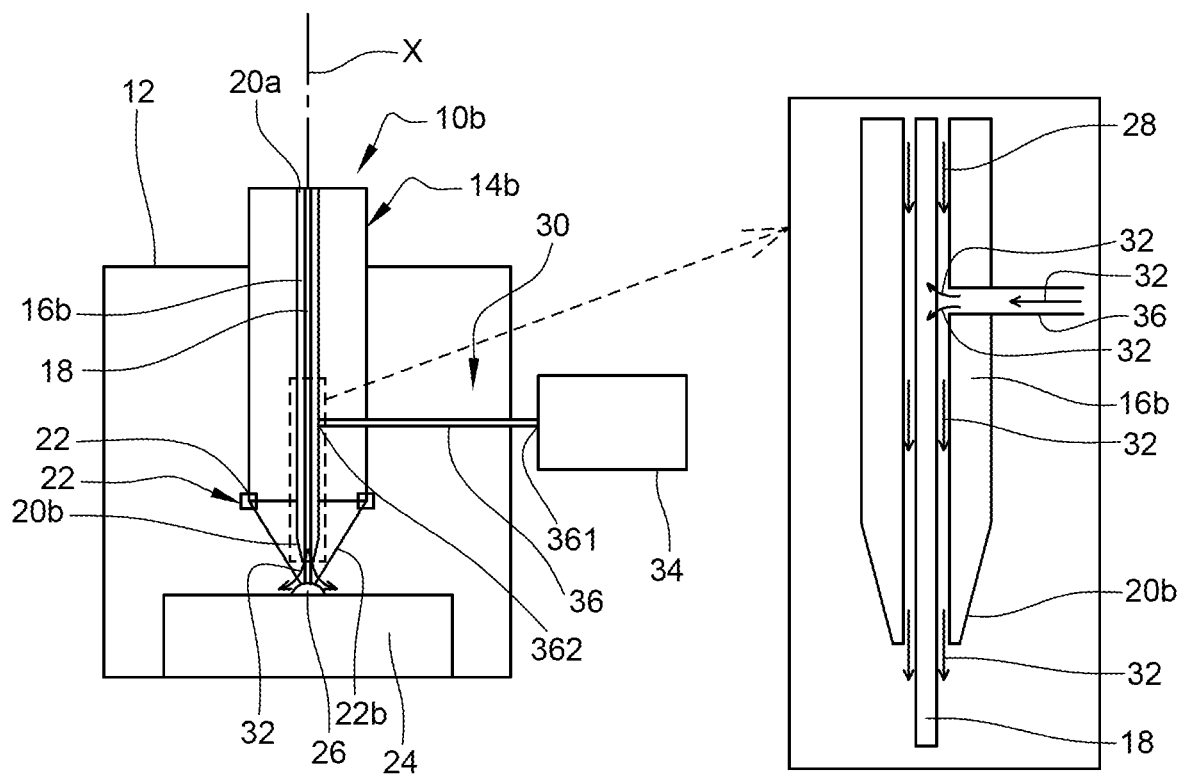
FIG. 2 is a schematic view of a three-dimensional printing device according to one embodiment described in this document.
Figure 3:
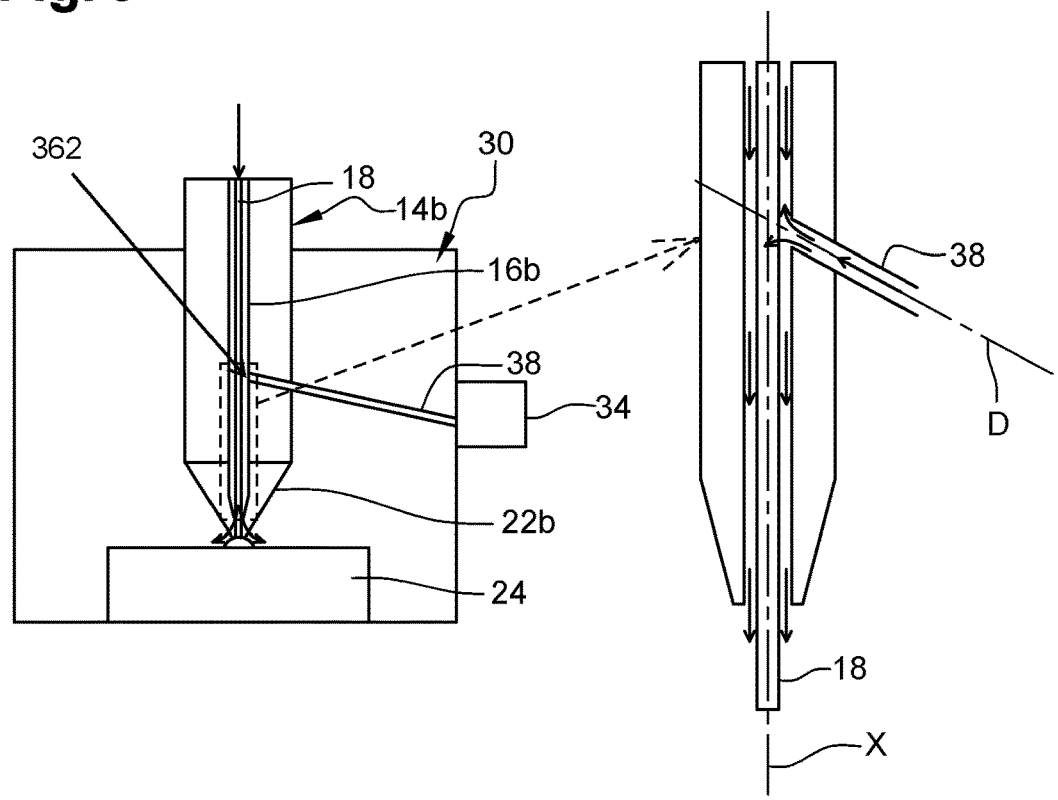
FIG. 3 is a schematic view of a device representing a variant of FIG. 2.

Reference is now made to FIG. 3 which is a variant of the embodiment shown in FIG. 2. It differs from this previous embodiment in that the inert gas supply conduit is not oriented at 90° to the wire guide conduit. Indeed, it can be observed that the downstream end 362 of the inert gas supply conduit 38 opens in direction D, forming at its downstream end an angle of less than 90° with the direction of elongation X of the guide conduit at the outlet of the inert gas supply conduit into the guide conduit. This orientation of less than 90° makes it possible to favour an orientation of the inert gas flow towards the end of the guide conduit which is opposite that arranged inside the enclosure 30.

Figure 4:
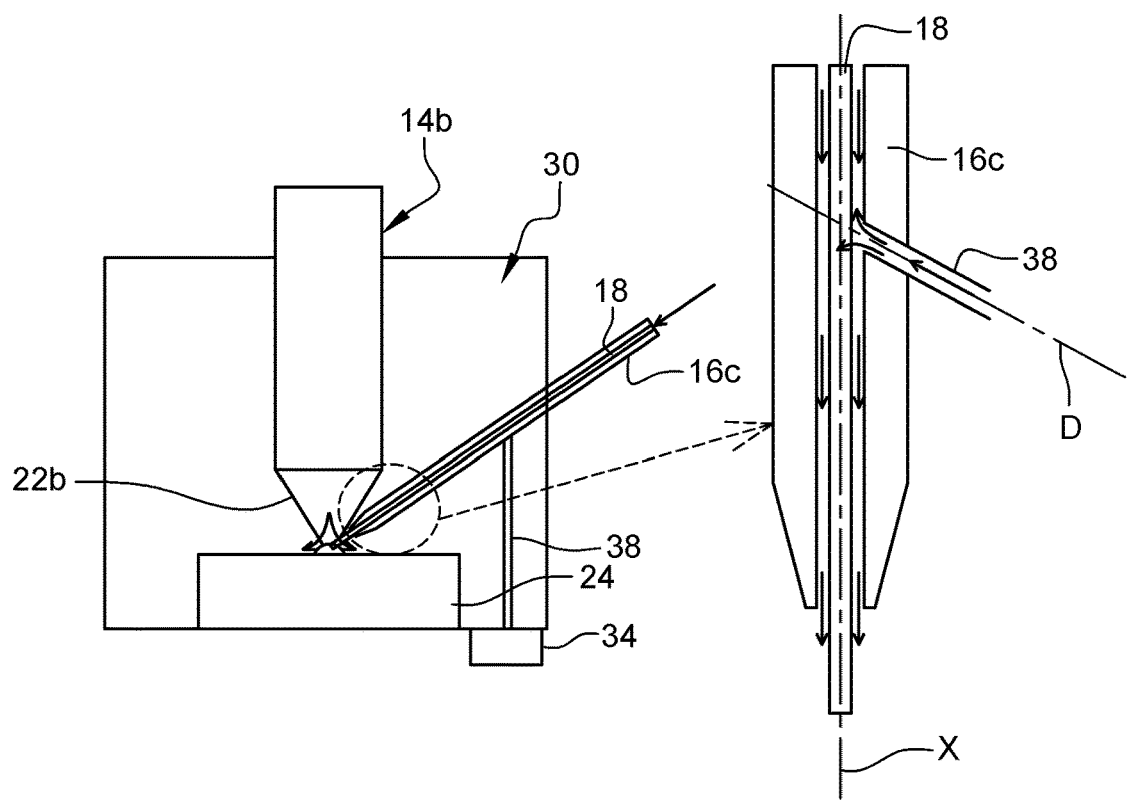
FIG. 4 is a schematic view of a device representing yet another variant.

The embodiment in FIG. 4 represents another embodiment wherein the guide conduit 16c is structurally distinct from the head 16b carrying the heating means 22b. Thus, it can be seen that the flow conduit is not mounted in an elongated tubular body as in the embodiment of FIG. 1.

The invention claimed is:

1. A device for three-dimensional printing by metal deposition comprising a guide conduit for guiding a metal wire, said guide conduit opening into an enclosure under an inert atmosphere, wherein the device comprises means for injecting an inert gas into the guide conduit, said injection means comprising an inert gas supply conduit, a downstream end of which opens into the guide conduit and an upstream end of which is connected to inert gas supply means, the guide conduit is substantially straight, the downstream end of the inert gas supply conduit extending in a direction forming an angle strictly less than 90° with respect to a direction of elongation of the guide conduit at an outlet of the inert gas supply conduit into the guide conduit, wherein said angle is comprised between a first rectilinear portion of the guide conduit and a second rectilinear portion of the inert gas supply conduit, the first rectilinear portion extending from a distal end of the guide conduit to the outlet of the inert gas supply conduit into the guide conduit and the second rectilinear portion joining the outlet of the gas supply conduit into the guide conduit.

2. The device according to claim 1, wherein the injection means is configured to inject the inert gas with a flow pressure between 2 and 6 bar.

3. The device according to claim 1, wherein the inert gas comprises argon or nitrogen.

4. The device according to claim 1, further comprising heating means capable of melting the wire.

5. The device according to claim 4, further comprising a head comprising the heating means which are arranged around the guide conduit.

6. The device according to claim 4, wherein the heating means comprises one or more means for emitting a laser beam, the laser beams converging at a given point of application of the metal wire.

* * * * *